May 16, 1961
G. POUZET
2,984,063
SUBMARINE CABLE
Filed July 1, 1957
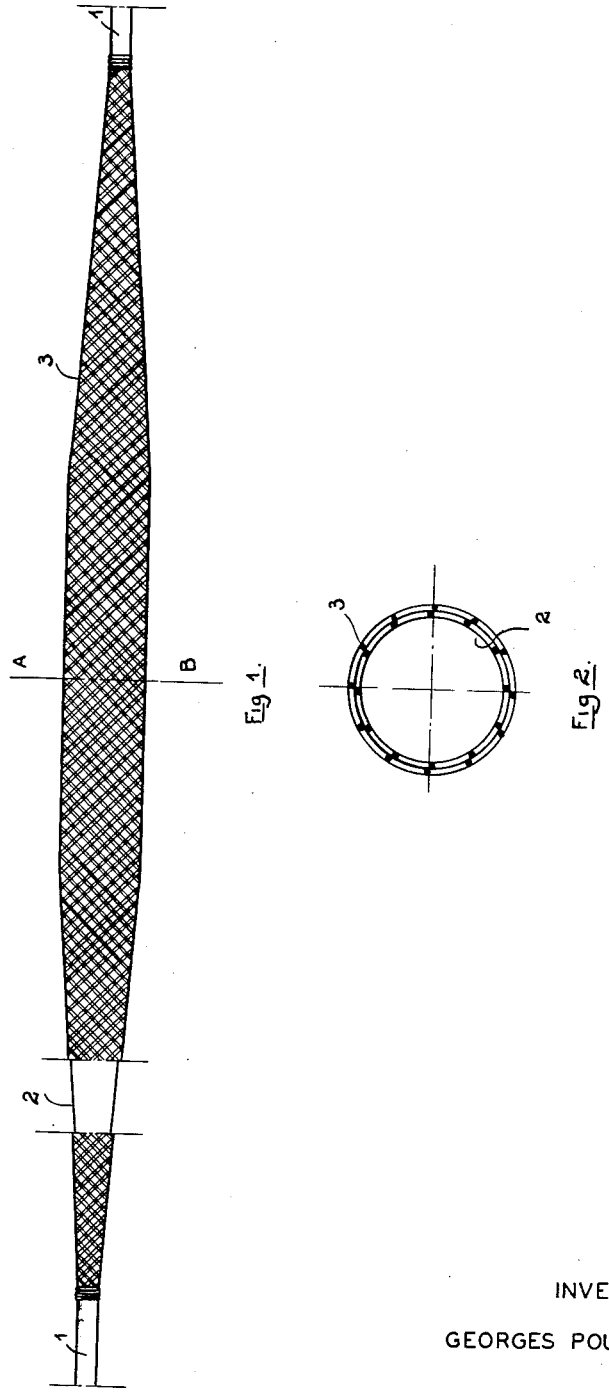
INVENTOR
GEORGES POUZET
BY
Paul M. Craig, Jr.
ATTORNEY

United States Patent Office 2,984,063
Patented May 16, 1961

2,984,063

SUBMARINE CABLE

Georges Pouzet, Asnieres, France, assignor to Compagnie Generale d'Electricite, Paris, France, a French corporation Filed July 1, 1957, Ser. No. 669,337

1 Claim. (Cl. 57—144)

The present invention relates to submarine electric cables. These cables have an armoring made of metal wires which is covered with one or more layers made of a material having a higher coefficient of friction than the armoring wires. The cables contain, from place to place, a flexible housing which may contain, for example, an amplifier or loading coals, and the diameter of which is larger than that of the cable portions between the housings, so that this housing forms a bulging portion of the cable. Cables of this kind are usually laid by paying them out on a drum or similar member, on which the housings incorporated on the cable are intended to pass.

The object of the invention is to facilitate the laying of these cables, even in the case in which the diameter of the housing is relatively large with respect to that of the cable.

This device is characterized in that the bulging portion of the cable is surrounded by a layer comprising a number of strands which are made of material having less friction on the drums of a laying machine, for example, as described hereinafter, than would that of the outermost above-mentioned layer and which, therefore, facilitates the slipping of the bulging portion.

The diameter of the housings incorporated in the cables has hitherto been restricted by the difficulties of fleeting on the drum of the laying machine, particularly when it is a question of the cables being laid deep. In this case, in fact, two, three or four turns have to be made on the laying drum, according to the depth of lay, in order to prevent the cable from slipping under the effect of the sometimes very heavy tension exerted on the cable which is entering the sea. In the case of repeater housings of large diameter, the adhesion to the laying drum, when the cable makes several turns, may become such that the force necessary for pulling the housing and paying it out into the sea requires several tons, so that there is a risk of deformation of the usccessive turns of the housing on the drum, which take the pressure of the fleeting knife of the laying machine.

Although it is desirable that the external diameter of the housing should not be too great, particularly when it is a question of work at great depth, the limitation of the diameter of the housing for these reasons was rather tiresome owing to the bulk of the equipment which might have to be placed there or by reason of the necessity in certain cases for concentrating the equipment on a short length in order to avoid troublesome interactions. This is the case, for example, with two-way carrier-frequency submarine repeaters, where it might be desirable to be able to reach an external diameter close to 200 millimetres.

In order to solve this problem of fleeting, it has certainly been proposed to use a machine with two drums, but, apart from the fact that its use necessitates completely changing the existing machines, the differences of diameter of the cable and the housing create variations of the speed of paying out, for which even dividing the two drums into independent wheel elements juxtaposed on the same shaft, is not a satisfactory remedy.

The device according to the present invention makes it possible to eliminate these difficulties owing to the arrangement of the slip wires on the housings, and to fleet on the laying machine housings of large diameter which are wound thereon in several turns, without the necessity for changing the usual drum of the laying machines of the cable ships.

The slip wires, in effect, reduce the friction of the cable at the place of the housing both in contact with the fleeting knife and in contact with the laying drum. Owing to the fact that the directions of these friction forces are at right angles to each other, the present inventor has found it preferable for the angle of the slip wires with the axis of the apparatus to be about 45°. Applicant has also found that the diameter of the slip wires should preferably be equal to or greater than 3 millimetres. Of course neither the angle of twisting nor the diameter of the wires indicated above are of a limitative character, and any other angle or diameter can be chosen without departing from the scope of the invention.

The attached drawings represent, by way of example, an embodiment of the device according to the invention in which the slip wires constitute a braid.

Fig. 1 is a longitudinal view of a housing arranged in accordance with the invention, and Fig. 2 a section along the axis A—B of Fig. 1.

In these figures, 1 represents the cable, 2 a bulging portion of the cable which comprises a housing, and 3 a wire of the braid.

The slip wires 3 shown in Fig. 2 have a cylindrical cross-section, but it might, for various reasons, and particularly for reasons of adhesion to the surface of the housing and also in order to reduce the diametrical bulk of the latter, be desirable to give the wires 3 a semi-cylindrical form.

However, any other cross-section or arrangement might be given to the slip wires, without departing from the scope of the invention.

The braid could be replaced by wires forming a series of concentric rings.

The slip wires may be of steel, bronze or any other metal. They can also be made of a non-metallic material such as polystyrene, nylon . . . , provided that its coefficient of friction on the metal of the laying drum is low.

What is claimed is:

A submarine cable comprising a number of concentric layers, said cable having a bulging portion and in which the layer of the cable which constitutes its outermost layer outside said bulging portion is made of a substance having a relatively high coefficient of friction and is covered, around said bulging portion, with a braid made of wires the substance of which has a relatively low coefficient of friction.

References Cited in the file of this patent

UNITED STATES PATENTS

| | | |
|---|---|---|
| 1,803,021 | Koella | Apr. 28, 1931 |
| 1,822,189 | Zapf | Sept. 8, 1931 |
| 1,835,771 | Gilbert | Dec. 8, 1931 |
| 1,905,197 | Webb | April 25, 1933 |
| 2,041,950 | Pierce | May 26, 1936 |
| 2,111,409 | Seaberg | Mar. 15, 1938 |
| 2,127,122 | Lamela | Aug. 16, 1938 |
| 2,277,177 | Wermine | Mar. 24, 1942 |
| 2,803,694 | Pouzet | Aug. 20, 1957 |

FOREIGN PATENTS

| | | |
|---|---|---|
| 33,202 | Netherlands | July 16, 1934 |
| 339,747 | Germany | Aug. 5, 1921 |
| 381,366 | Great Britain | Oct. 6, 1932 |
| 1,053,315 | France | Sept. 30, 1953 |

OTHER REFERENCES

AIEE Transactions, Vol. 70, part I, pages 565, 566. (Copy in Division 69 in 174-70.1.)